United States Patent [19]

Sun

[11] Patent Number: 4,724,176
[45] Date of Patent: Feb. 9, 1988

[54] HEAT SHRINKABLE CONTAINER

[76] Inventor: Joseph Z. Sun, 14 Cheng Kong Road, Feng Shan, Taiwan 830, Taiwan

[21] Appl. No.: 585,601

[22] Filed: Feb. 21, 1984

Related U.S. Application Data

[63] Continuation of Ser. No. 476,709, Mar. 18, 1983, abandoned.

[51] Int. Cl.$^4$ .............................................. B32B 1/02
[52] U.S. Cl. ........................................ 428/35; 428/421; 428/475.8; 428/476.1; 428/483; 428/518
[58] Field of Search .................. 428/35, 421, 475.8, 428/36, 476.1, 483, 518

[56] References Cited

U.S. PATENT DOCUMENTS

| | | | |
|---|---|---|---|
| 3,201,503 | 8/1965 | Benning et al. | 428/518 |
| 3,524,795 | 8/1970 | Peterson | 428/518 |
| 3,741,253 | 6/1973 | Brax et al. | 138/137 |
| 4,048,428 | 9/1977 | Baird et al. | 526/343 |
| 4,057,667 | 11/1977 | Wiggins et al. | 428/35 |
| 4,064,296 | 12/1977 | Bornstein et al. | 428/35 |
| 4,225,373 | 9/1980 | Bieler et al. | 156/198 |
| 4,247,584 | 1/1981 | Widiger et al. | 428/35 |

Primary Examiner—Alexander S. Thomas
Attorney, Agent, or Firm—Joseph Zu Sun

[57] ABSTRACT

A novel process for manufacturing a container achieved by coextruding a middle tube of material having a low oxygen transmission rate between outer and inner tubes of olefin polymer to form a multilayered tubular unit. The outer tube is cross linked and the unit is biaxially oriented to a desired size. The inner tube is sealed to itself to complete formation of the container which includes an inner layer of olefin polymer, a middle layer of material having low oxygen permeability, and a relatively strong outer layer of cross linked olefin polymer.

14 Claims, 3 Drawing Figures

HEAT SHRINKABLE CONTAINER

This is a continuation, of application Ser. No. 06/476,709 filed Mar. 18, 1983, now abandoned.

BACKGROUND OF THE INVENTION

The present invention relates to a novel heat shrinkable container especially useful for food stuffs and the process for manufacturing the same.

Barrier laminates have been used in the past to protect food stuffs from spoilage. In this regard, reference is made to U.S. Pat. No. 3,741,253 which describes a laminate using Saran as a sealing middle layer between an inner layer of irradiated ethylene vinyl acetate polymer and an outer layer of ethylene/ vinyl acetate polymer which is not cross linked by irradiation. Although this laminate solves several of the problems of permeability of oxygen and water, it should be noted that the packaging film described in this patent does not possess a shipping abuse resistant outer layer which renders the film susceptible to loss of integrity through abrasion. In addition, the cross linked inner layer is hard to self weld to prevent breakage by puncturing in the process of packaging. The process of manufacturing the film of the prior art, heretofore identified, is a coating process which is more expensive and energy consuming than a coextrusion process in that more dies are required and a large amount of plasticizer is necessary in its production. The latter step reduces the oxygen and water barriers of the inner Saran layer. Also, it should be noted that a coating process, despite the most careful manufacturing technique, traps air between the layers which causes a bad appearance and causes weakening through separation and delamination of the same. Also, sealing the laminate of the prior art presents a problem in that the soft outer layer tends to stick to the jaws of the sealing devices which necessitates the employment of mechanical crimping, a slower and more expensive method of manufacture. Moreover, crystallization can occur in the Saran layer if excess heat or plasticization reaches the same. This occurrence will result in decrease in elongation of the film during the biaxially orientation process and clip fracturing during packaging.

A heat shrinkable container which solves the problems of the prior art hereinabove described would be a great advance in the food packaging industry.

SUMMARY OF THE INVENTION

In accordance with the present invention a novel container especially useful for packaging food stuffs and a process for manufacturing the same is provided which overcomes the disadvantages of the prior art.

The heat shrinkable container manufacturing process utilizes coextruding a middle tube of material having an oxygen transmission rate of less than 200 cc/m$^2$, 24 hours at 23° C., between outer and inner tubes of an olefin polymer. The resultant coextrusion forms a multilayered tubular unit. The outer tube and inner tube may comprise polymers of ethylene and vinyl acetate. The outer layer would be formed to have a thickness in excess of either the middle or inner layers. The middle tube may be formed of a copolymer of vinylidene chloride and vinyl chloride, i.e. commonly known as Saran.

The tube may be flattened such that the outer layer is easily cross linked by irradiation. Such irradiation may be applied to one side of the flat tube and then by changing the direction of the flattened tube in a continuous process, reirradiating the back side of the same tube. It follows that the tube is reinflated, and heated in a conventional manner to biaxially orient or form the multilayered tubular unit to a desired size. The container is finally formed by sealing the inner tube to itself.

It should be noted that other agents such as stabilizers, pigmenting agents, blocking agents, and the like, are added to the compositions recited in the specification in accordance with known practices in the art of forming packages.

Reference is made to U.S. Pat. No. 4,064,296 which describes a coextrusion process for a multilayer film. However, the process uses hydrolized ethylene vinyl acetate copolymer which does not generally provide oxygen impermeability under moist conditions.

It may be apparent that a novel and useful process and product from the process has been described for a container for food stuffs.

It is therefore an object of the present invention to provide a process and product therefrom which produces a container useful for the packaging of food stuffs which possesses a great degree of resistance to shipping abuse in the form of mechanical abrasion, and/or extremely cold conditions.

It is another object of the present invention to provide a heat shrinkable container and process for making the same which possesses a degree of puncture resistance by self welding before breakage in the integrity of the container.

It is yet another object of the present invention to provide a container for food stuffs and a process for making the same which reduces the possibility of pinholing, especially during the step of biaxially orientation of the container.

It is still another object of the present invention to provide a container for the packaging of food stuffs and a process for manufacturing the same which minimizes the possibility of the crystallization of the water and oxygen impermeable barrier layer during the process of manufacture of the same.

Another object of the present invention is to provide a container for food stuffs and a process for manufacturing the same which is easily formed into bags by sealing the inner layer upon itself upon the application of heat.

It is still another object of the present invention to provide a container for food stuffs and a process for manufacturing the same which eliminates the problems of trapped air between the laminates usually occuring in a coating process of the prior art.

It is yet another object of the present invention to provide a container for the packaging of food stuffs and process for manufacturing the same which reduces the amount of plasticizer required and the size of the manufacturing equipment normally required in a coating process, thus reducing the overall cost of the production of the container.

It is yet another object of the present invention to provide a container for the packaging of food stuffs and a process for manufacturing the same which may be cross linked in its outer layer by controlled irradiation.

The invention possesses other objects and advantages especially as concerns particular characteristics and features thereof, which will become apparent as the specification continues.

For a better understanding of the invention reference is made to the following detailed description which should be referenced to the hereinabove described drawings.

DESCRIPTION OF THE PREFERRED EMBODIMENTS

Various aspects of the present invention will evolve from the following detailed description of the preferred embodiments, which should be taken in conjunction with the hereinabove described drawings.

Figure 1:
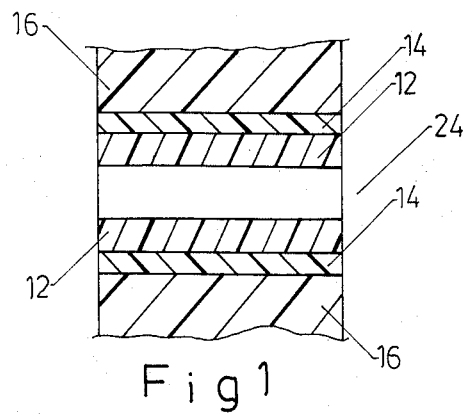
FIG. 1 is a sectional view of the laminate used for the container of the present invention.

The invention as a whole is represented by reference character 10, which depicts a container which is especially useful for the storage and transportation of food stuffs. Container 10 is generally formed by coextruding three concentric tubes, 12, 14, and 16, FIG. 1. Tube 12 provides a first inner layer of an olefin polymer. Tube 16 provides the third, outer layer utilizing an olefin polymer which has been cross linked to withstand shipping abuses, which will be hereinafter described. Tube 14 forming the middle layer is constructed of a material having a low oxygen transmission rate, i.e. less than 200 $cc/m^2$, 24 hours at 23° C. Saran or vinylidene chloride polymers may be used for this purpose. Saran is defined as a polymer made by polymerizing vinylidene chloride and vinyl chloride. Other polymers may be employed to form the oxygen impermeable middle layer 14, such as the fluorocarbon polymers.

First layer 12 may possess a thickness ranging from 3 to 7 mils. In comparison, second middle layer 14 would possess a thickness ranging between 2 and 5 mils. The third layer 16 is relatively thick in relation to first and second layers 12 and 14, and might have a thickness ranging between 14 and 20 mils.

The inner layer 12 may have the composition of an ethylene-vinyl acetate copolymer with a vinyl acetate weight of 4% to 22%. The upper part of this range is generally considered to be a very high percentage of this component, such a combination produces a self welding characteristic whereby the inner layer 12 welds to itself under normal heat shrinking conditions. Such self welding characteristic would remedy the problem occurring through puncture of the multi-ply film 10 by a bone. In other words, "balloon-up" would be eliminated as a problem in packaging.

Figure 2:
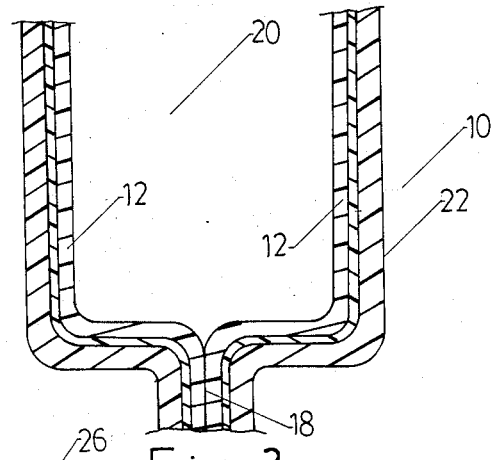
FIG. 2 is a sectional view of the container of the present invention.

With reference to FIG. 2, it may be seen that layer 12 welds to itself to form a seal along seam 18. As heretofore described, application of a vacuum to the interior 20 of container 22 would bring layer 12 together everywhere except those areas interrupted by the food product 24 within interior 20 of container 22. The subsequent application of heat during the heat shrinkage step would weld all areas where first layer 12 touches itself within container 22. It should be noted that prior art containers which have a cross linked inner layer are not capable of performing this function.

In addition, it should be pointed out that outer layer 16 may itself be a coextrusion of olefin polymers, namely ethylene and vinyl acetate having 3.5% to 5.5% vinyl acetate as the outer layer, and a polymer of ethylene and vinyl acetate having 8.5% to 15% vinyl acetate by weight as an inner layer. The outermost layer of outer layer 16 would function as a layer resistant to shipping abuse and heat seal burn-through while inner layer of outer layer 16 would be resistant to cold storage puncture.

Figure 3:
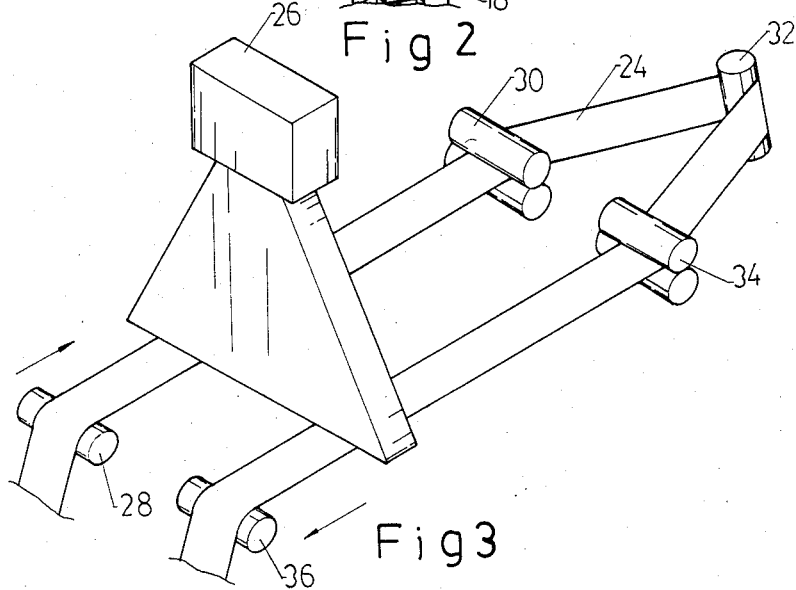
FIG. 3 is a perspective schematic of the irradiation step performed in the process of the present invention.

Turning to the process for producing container 10, middle tube 14 is coextruded between inner and outer layers 12 and 16 having the chemical components hereinabove described. Such coextrusion is known in the art and will not be further described herein. Reference is made to U.S. Pat. No. 3,802,826, which describes such a process. The tube is generally flattened after coextrusion and delivered to irradiation device 26, FIG. 3. Irradiation device 26 delivers the proper amount of radiation to flatten tube 24 which travels over rollers 28, through pinch rollers 30, and over reversing roller 32. At this point flattened tube 24 is sent back to irradiation device 26 through pinch rollers 34 and to the next step in the process over roller 36. The delivering of radiation to a suitable penetration depth in flattened tube 24 is critical. However, electron beam irradiation can be very closely controlled by adjusting the applied voltage such that it penetrates a particular depth of material. It is known that electron beam irradiation penetration recedes to zero dramatically in direct relationship to the applied voltage. Thus, the entire outer layer of tube 24 is cross linked and possesses a higher melting point thereby. It should be apparent that the coextruded tube 24 would be cooled before flattening and cross-linking is hereinabove described.

The formed and cross-linked tube 24 is then reinflated and passed into a heating medium such as a hot water bath for biaxially orientation which is known in the art. The prior art film's heating of the outer layer weakened the same. The outer layer of the present invention being cross-linked is able to withstand substantially more heating than the inner layers 12 and 14, thus pinholing is substantially reduced, if not entirely eliminated. It should also be noted that the oxygen and water impermeable barrier layer 14 is not weakened by the biaxial orientation. Saran tends to crystallize upon the application of heat, however, relatively thick cross-linked layer 16 serves as a shield to prevent this phenomenon from occurring. Also, a lesser amount of Saran is required than in the prior art as a hedge against crystallization of the same. Moreover, the antiblocking agents such as starch, which are normally used in the processing of multilaminate films, are found only in layer 12, thus obviating the disadvantage of the use of such agents, namely unacceptable appearance and a roughened surface which is unsuitable for printing. It may be apparent that the container of the present invention may use a larger amount of anti-blocking agents than in the prior art in this regard without affecting the sealing characteristics. On the other hand, less plasticizers are necessary in the coextrusion process described above as would be required in a coating process of the prior art.

After orientation, the tube is expanded into a bubble, cooled, flattened, and wound up for storage. The application of heat to the flattened tube causes sealing of the inner layer 12 to itself to form containers such as bags or coverings for food stuffs. Again, the application of heat would have little effect on the thick outer crosslinked layer 16.

The invention is further illustrated by the following examples:

EXAMPLE I

A four inch tape was assembled by the process described above such that the outer layer 16 was formed from ethylene-vinyl acetate, 14 mils; middle layer 14 was formed from Saran, 2.0 mils; and the inner layer 12 was formed from ethylene-vinyl acetate, 4.5 mils. The EVA copolymer used in inner layer 12 and outer layer 16 contained 3% to 5% vinyl acetate by weight and possessed a melt index of 0.25, ASTM method D 1238, condition E. The Saran layer 14 was a 90% copolymer of vinylidene chloridevinyl chloride. The Saran layer was plasticized with 4% linseed oil and stabilized with 1% organic tin type stabilizers. The exiting extrudate temperature was measured at approximately 340° F. The four inch tape was passed through the beam of a 0.25 MEV Energy Science ElectroCurtain accelerator. The outer layer 16 received a dosage of 6.5 MR (megarads). After irradiation, the flattened tape was passed through a water tank having a water temperature of 200° F. Tube 24 was oriented into a sixteen inch diameter having a total thickness of 1.8 mils. The orientation bubble was stable and the appearance of the film was excellent. The resulting film had a 32% free shrink in the transverse direction at 195° F., determined by ASTM method D 2732.

EXAMPLE II

A four inch tube was again produced by the extruder conditions described in Example I. The inner and outer layers 12 and 16 of tube 24 will form from ethylenevinyl acetate copolymer having a 9½% vinyl acetate content, by weight, and a melt index of 0.7, ASTM method D 1238, condition E. Tube 24 was flattened into a tape having a four inch width. Irradiation was performed as described in Example I to the dosage levels at 6.5 MR. The orientation bubble was produced and biaxially orientation took place as described in Example I. Bags were made from the orientation tubing of this example by making a transverse heat seal across the web and severing the tubing parallel to and immediately behind the seal. Thus, layer 12 was sealed to itself.

EXAMPLE III

A multilayerd tube 24 was produced by the same coextrusion process described above. Outer layer 16 was itself a coextrusion of EVA 1, 4.5% vinyl acetate by weight, 0.25 MI, NPE 481, produced by the Northern Chemical Company, EVA 1 was employed as the outermost layer of outer layer 16. EVA 2 was used as the inner layer of outer layer 16 and contained 9½% vinyl acetate by weight, 0.7 MI manufactured by Dupont De Nemours. The ratio of the EVA 1 to EVA 2 was approximately 1:3. Irradiation, biaxial orientation, and bag production was performed in the same manner as described in Examples I and II.

Although the preferred method of cross-linking outer layer 16 is by irradiation, chemical cross-linking may also be employed. Peroxides such as 2, 5, dimethyl2. 5 di (t-butylperoxy) hexane as described in U.S. Pat. No. 3,201,503. It should be noted that care must be taken in controlling the extruded temperature with chemical cross-linking in order to forestall premature cross-linking in the extruder barrel or in the die. Photosensitive cross-linking agents may also be incorporated such that upon the exposure to ultraviolet light, crosslinking takes place.

Although the preferred embodiment shows the construction of a multilayered structured in a tubular form with annular layers, it should be noted that a coextrusion slot die may be used in conjunction with a tenter frame during the biaxial orientation step.

While in the foregoing specification embodiments of the present invention have been set forth in considerable detail for the purposes of making a complete disclosure of the invention, it may be apparent to those of skill in the art that numerous changes may be made in such details without departing from the spirit and principles of the invention.

What is claimed is:

1. A coextruded tubular heat shrinkable container especially useful for, but not limited to, a package for foodstuffs comprising:
    a. a self-sealable first inner tube adapted for lying adjacent the foodstuff comprising an unirradiated thermoplastic polymer or copolymer, said first inner tube being sealed to itself only at the bottom end of said container prior to usage,
    b. a second middle barrier tube joined to said first inner tube comprising a material having an oxygen transmission rate of less than 200 $cc/m^2$ per 24 hours, at 23° C., lying between said first inner tube and a third outer tube to form said coextruded tubular container,
    c. said third outer tube comprising an irradiation crosslinked polymer or copolymer.

2. The heat shrinkable container of claim 1 in which said thermoplastic polymer or copolymer of said first inner and third outer tubes comprising an ethylene-vinyl acetate copolymer.

3. The heat shrinkable container of said claim 2 in which said first inner tube comprising a copolymer of ethylene-vinyl acetate having 4% to 22% by weight of vinyl acetate, while said third outer tube comprising a copolymer of ethylene-vinyl acetate having 3.5% to 9.5% by weight of vinyl acetate.

4. The heat shrinkable container of claim 2 in which said first inner tube comprises a self-weldable material under vacuum condition with the needed heat for welding being supplied from the heat shrinkage operation of said seld-weldable heat shrinkable container during usage.

5. The heat shrinkable container of claim 4 in which said first inner tube comprises a copolymer of ethylene-vinyl acetate having 4% to 22% by weight of vinyl acetate.

6. The heat shrinkable container of claim 1 in which said thermoplastic polymer or copolymer of said first inner and third outer tubes is selected from the group consisting of nylon, polyester, and polystyrene.

7. The coextruded tubular heat shrinkable container of claim 1 in which said coextrusion, irradiation, heat shrinkability and sealing associated with the production of said coextruded tubular heat shrinkable container comprises:
    a. coextruding a multilayered tubular precursor of said coextruded container with said second middle barrier tube lying between said third outer tube and said first inner tube,
    b. flattening said multilayered tubular precursor after said coextrusion,
    c. irradiating the flattened multilayered tubular precursor with a voltage controlled electron beam device on both sides of said flattened multilayered precursor such that only said third outer tube is penetrated by irradiation leaving the other two layers intact from irradiation,
    d. controlling the line speed of said multilayered precursor such that a sufficient amount of irradiation dosage to effect the crosslinking for impact strength improvement of said third outer tube is applied to said third outer tube, e. heating and applying pressure to inflate said multilayered precursor to a desired size and render the resultant container heat shrinkable, f. sealing said first inner tube of the resultant material in (e) to itself at the bottom end.

8. The coextruded multilayered tubular precursor of claim 7 in which said first inner tube having a thickness of 3-7 mils, said second middle barrier tube having a thickness of 2-5 mils, and said third outer tube having a thickness of 14-20 mils while each layer in the resultant inflated container having proportionate thickness, respectively.

9. The heat shrinkable container of claim 1 in which said second middle barrier tube comprising an irradiation sensitive material and being intact from irradiation.

10. The heat shrinkable container of claim 9 in which said second middle barrier tube comprises a copolymer of vinylidene chloride and vinyl chloride having 70% by weight of vinyl chloride.

11. The heat shrinkable container of claim 9 in which said third outer tube comprises an irradiation crosslinked polyolefin.

12. The heat shrinkable container of claim 1 in which said third outer tube comprises a lamination of a copolymer of ethylene-vinyl acetate having a 3.5% to 5.5% by weight of vinyl acetate as an outer layer and a copolymer of ethylenevinyl acetate having 8.5% to 15% vinyl acetate by weight as an inner layer.

13. The heat shrinkable container of claim 1 in which said third outer tube comprises a copolymer of ethylene-vinyl acetate having 4 to 22% by weight of vinyl acetate.

14. The heat shrinkable container of claim 1 in which said second middle barrier tube comprises a fluorocarbon polymer or copolymer.

* * * * *